United States Patent
Grewing et al.

(10) Patent No.: US 8,437,442 B2
(45) Date of Patent: May 7, 2013

(54) METHOD AND APPARATUS FOR GENERATING A CARRIER FREQUENCY SIGNAL

(75) Inventors: Christian Grewing, Taeby (SE); Anders Jakobsson, Kista (SE); Ola Pettersson, Järfälla (SE); Anders Emericks, Solna (SE); Bingxin Li, Sundbyberg (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 351 days.

(21) Appl. No.: 12/819,910

(22) Filed: Jun. 21, 2010

(65) Prior Publication Data

US 2010/0329372 A1    Dec. 30, 2010

Related U.S. Application Data

(63) Continuation of application No. PCT/CN2009/070450, filed on Feb. 17, 2009.

(51) Int. Cl.
*H03D 3/24* (2006.01)
(52) U.S. Cl.
USPC ........... 375/376; 375/375; 375/373; 375/327; 375/268; 455/42; 455/75; 455/76; 455/108
(58) Field of Classification Search .......... 375/376, 375/375, 373, 327, 268; 455/32, 75, 76, 455/108
See application file for complete search history.

(56) References Cited

U.S. PATENT DOCUMENTS

| | | | |
|---|---|---|---|
| 7,792,501 B2 * | 9/2010 | Ahn | 455/114.1 |
| 2004/0192231 A1 | 9/2004 | Grewing et al. | |
| 2005/0062551 A1 * | 3/2005 | Coppola et al. | 331/36 C |
| 2005/0185749 A1 * | 8/2005 | Convent et al. | 375/376 |
| 2005/0275481 A1 * | 12/2005 | Grewing et al. | 332/127 |
| 2007/0013447 A1 | 1/2007 | Hirano et al. | |
| 2007/0149148 A1 | 6/2007 | Yoshikawa et al. | |
| 2008/0074208 A1 | 3/2008 | Lee | |

FOREIGN PATENT DOCUMENTS

CN    1513225 A    7/2004

OTHER PUBLICATIONS

State Intellectual Property Office of the People's Republic of China, International Search Report in International Patent Application No. PCT/CN2009/070450 (Nov. 26, 2009).
1st Office Action in corresponding Chinese Patent Application No. 200980156326.0 (Jan. 18, 2013).

* cited by examiner

*Primary Examiner* — Phuong Phu
(74) *Attorney, Agent, or Firm* — Leydig, Voit & Mayer, Ltd.

(57) ABSTRACT

A method and apparatus for generating a carrier frequency signal is disclosed. The method includes generating a first frequency signal; injecting a modulation signal at a first point of the two-point modulation architecture; generating a second frequency signal from the modulation signal; introducing the second frequency signal by mixing the first frequency signal and the second frequency signal to generate a mixed frequency signal and outputting the carrier frequency signal selected from the mixed frequency signal.

20 Claims, 8 Drawing Sheets

METHOD AND APPARATUS FOR GENERATING A CARRIER FREQUENCY SIGNAL

CROSS-REFERENCE TO RELATED APPLICATIONS

This application is a continuation of International Application No. PCT/CN2009/070450, filed on Feb. 17, 2009, which is hereby incorporated by reference in it entirety

FIELD OF THE INVENTION

The present invention relates to a communication field; especially it relates to a method and apparatus for generating a carrier frequency signal.

BACKGROUND OF THE INVENTION

Using a polar modulation architecture, phase modulation of the carrier is performed by means of modulating the Phase Locked Loop (PLL) in the frequency synthesizer that is used to generate the carrier. In order to minimize noise from the PLL, its loop filter (LPF) bandwidth is often relatively small. The modulation bandwidth of modern wireless communication protocols like Wideband Code Division Multiple Access (WCDMA), Enhanced Data Rates for GSM Evolution (EDGE) and others is large compared to this bandwidth. In addition, the bandwidth needed for phase modulation is roughly five times the modulation bandwidth. This poses a problem when directly modulating the PLL, since it effectively applies a low pass filter to the modulation and thereby limits the modulation bandwidth.

SUMMARY OF THE INVENTION

Problems

It is a problem to modulate the PLL directly because of the relatively low loop bandwidth which limits the highest implementable modulation bandwidth.

One further problem is how to match the modulation and the counter-modulation with a two-point modulation architecture.

One further problem is how to avoid pulling and injection locking of an oscillator.

One further problem is how to realize fast channel hopping.
Solution

With the purpose of solving one or more of the above indicated problems, and from the standpoint of the above indicated field of invention, the present invention teaches that:

An embodiment of the present invention provides a method for generating a carrier frequency signal in a two-point modulation architecture, including: generating a first frequency signal; injecting a modulation signal at a first point of the two-point modulation architecture; generating a second frequency signal from the modulation signal; introducing the second frequency signal by mixing the first frequency signal and the second frequency signal to generate a mixed frequency signal; outputting the carrier frequency signal selected from the mixed frequency signal; and feeding back the carrier frequency signal to a feedback path.

In a further development, the method further includes: counter-modulating the first point modulation signal at a second point of the two-point modulation architecture.

Furthermore, the modulation signal is a Digital Modulation Word (DMW).

Furthermore, the modulation signal is a modulation voltage (MV).

In a further development, generating a first frequency signal includes generating the first frequency signal from a digital tuning word (DTW).

In a further development, generating a first frequency signal comprises generating the first frequency signal from a tuning voltage (TV).

In a further development, introducing the second frequency signal into the loop by mixing the first frequency signal and the second frequency signal to generate a mixed frequency signal includes: mixing the first frequency signal with the second frequency signal, and output the mixed frequency signal that contain the difference and the sum of the first frequency and the second frequency; and outputting the carrier frequency signal selected from the mixed frequency signal includes: selecting the carrier frequency signal from the mixed frequency signal, wherein the carrier frequency is either the difference or the sum of the first frequency and the second frequency, and output the carrier frequency signal.

Further, mixing the first frequency signal and the second frequency signal to generate a mixed frequency signal further includes modulating the amplitude of the mixed frequency signal.

Furthermore, generating a first frequency signal includes generating the first frequency signal whose frequency is not the same as the carrier frequency and any harmonics of the carrier frequency.

Furthermore, generating a second frequency signal from the modulation signal includes generating the second frequency signal whose frequency is not the same as the carrier frequency and any harmonics of the carrier frequency from the modulation signal.

In a further development, the method further comprises selecting the channel by varying the second frequency.

One embodiment of the present invention provides an apparatus for generating a carrier frequency signal with a two-point modulation architecture, including: a tuning oscillator (TO), configured to generate a first frequency signal; a modulation oscillator (MO), to which is injected a modulation signal (MS) at a first point of the two-point modulation architecture, and which is configured to generate a second frequency signal from the modulation signal; and an output module, configured to introduce the second frequency signal into the loop after the TO by mixing the first frequency signal and the second frequency signal to generate a mixed frequency signal, output the carrier frequency signal selected from the mixed frequency signal, and feed back the carrier frequency signal to a feedback path.

In a further development, the apparatus further includes: a PLL, configured to counter-modulate the first point modulation signal at a second point in the two-point modulation architecture.

Furthermore, the MO is a first digitally controlled oscillator (DCO).

Furthermore, the input signal of the first DCO is a digital modulation word (DMW).

Furthermore, the MO is a first voltage controlled oscillator (VCO).

Furthermore, the input signal of the first VCO is a modulation voltage (MV).

Further, the MO is a hybrid oscillator.

Further, the input signal of the hybrid oscillator is both a MV and a DMW.

Further, the TO is a second DCO.

Furthermore, the input signal of the second DCO is a digital tuning word (DTW).

Further, the TO is a second VCO.

Furthermore, the input signal of the second VCO is a tuning voltage (TV).

Furthermore, the output module includes: a mixer, configured to mix the first frequency signal with the second frequency signal, and output the mixed frequency signal that contain the difference and the sum of the first frequency and the second frequency; and an output filter, configured to select the carrier frequency signal from the mixed frequency signal, wherein the carrier frequency is either the difference or the sum of the first frequency and the second frequency, output the carrier frequency signal, and feed back the carrier frequency signal to a feedback path.

Furthermore, the output module is configured to modulate the amplitude of the mixed frequency signal.

Furthermore, the TO is configured to generate the first frequency signal whose frequency is not the same as the carrier frequency and any harmonics of the carrier frequency.

The MO is further configured to generate the second frequency signal whose frequency is not the same as the carrier frequency and any harmonics of the carrier frequency.

Further, the MO is configured to perform channel selection by varying the second frequency.

For further development, the apparatus is used in a base station.

Advantages

The advantage of a method and an apparatus according to some embodiments of the present invention is that the PLL can be modulated in a high modulation bandwidth because of the two-point modulation architecture.

The further advantage according to one embodiment is that a two-point modulation architecture can be implemented with much increased matching between modulation and counter modulation and thereby increasing the modulation accuracy.

The further advantage according to one embodiment is that a drift in the second frequency can be compensated by an equal change in the first frequency.

The further advantage according to one embodiment is that pulling and injection locking of the oscillator can be reduced or avoided.

The further advantage according to one embodiment is that it can enable faster channel hopping.

BRIEF DESCRIPTION OF THE DRAWINGS

A method and an apparatus according to the present invention will now be described in detail with reference to the accompanying drawings, in which.

DETAILED DESCRIPTION OF THE EMBODIMENTS

To circumvent the problem of low bandwidth it is possible to use two-point modulation architecture where the modulation signal may be inserted at one point to modulate the output of the loop (PLL), and counter-inserted in the loop feedback path so that the loop does not see the modulation.

Figure 1:
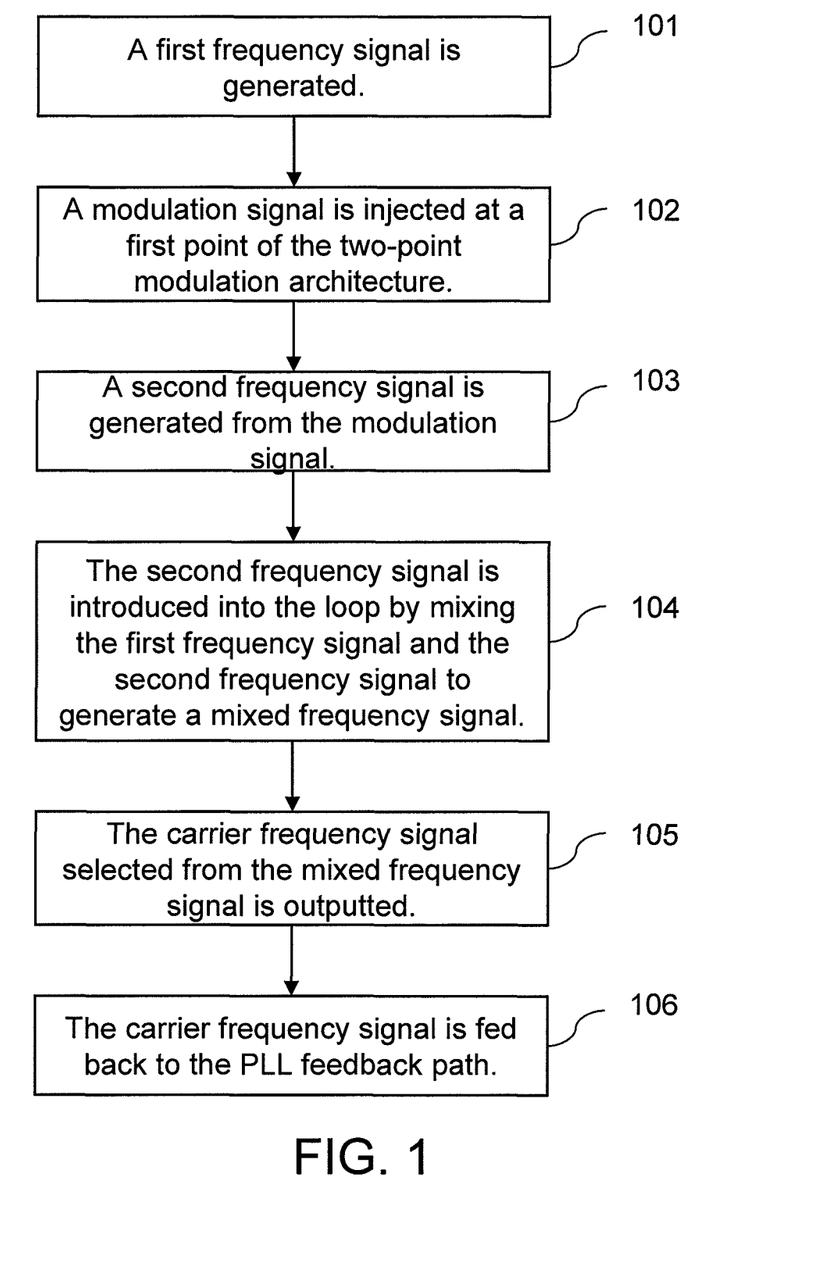
FIG. 1 is a block diagram of one embodiment of the present invention.

One embodiment of the present invention will now be described with reference to FIG. 1 showing a method for generating a carrier frequency signal in a two-point modulation architecture.

Block 101: A first frequency signal is generated.

The first frequency may be denoted f1.

This embodiment may include generating the first frequency signal from a digital tuning word (DTW) or generating the first frequency signal from a tuning voltage (TV) depending on if a digital controlled oscillator (DCO) or a voltage controlled oscillator (VCO) is used. The DTW or TV is the output of a PLL.

An additional problem encountered is the effect of pulling and injection locking of the oscillator which causes spurs at the output. So this embodiment may specifically include generating the first frequency signal whose frequency is not the same as the carrier frequency fc and any harmonics of the carrier frequency. Since the f1 is not the same as the carrier frequency fc or its harmonics, the problem with pulling and injection locking is reduced or avoided.

Block 102: A modulation signal is injected at a first point of the two-point modulation architecture.

The modulation signal (MS) may be a digital modulation Word (DMW) or a modulation voltage (MV) or a combination of a DMW and a MV depending on if the DCO or VCO or hybrid oscillator is used.

One problem with the two-point modulation architecture is matching the modulation and counter modulation, since the counter modulation signal is often digital in nature whereas the other often is analogue. If the modulation signal is a digital signal like the DMW, since both the modulation signal and counter-modulation signal are essentially digital the matching between modulation and counter-modulation can be greatly increased and process and temperature invariant because of its digital nature and well controlled gain. This increased matching compared to prior art increases modulation accuracy. If a hybrid oscillator is used with a course digital control and an analogue fine control this matching can be obtained at a lesser, but still sufficient degree. The use of a hybrid oscillator may increase the resolution and flexibility of the system. This can be implemented in all embodiments in the present invention, and the similar advantages can be achieved.

Block 103: A second frequency signal is generated from the modulation signal.

The second frequency may be denoted f2.

This embodiment may specifically include generating the second frequency signal whose frequency is not the same as the carrier frequency fc and any harmonics of the carrier frequency from the modulation signal. Since the f2 is not the same as the carrier frequency fc or its harmonics, the problem with pulling and injection locking is reduced or avoided.

The controlling of the first frequency and the second frequency can be implemented in all embodiments in the present invention, and the similar advantages can be achieved.

Block 104: The second frequency signal is introduced into the loop by mixing the first frequency signal and the second frequency signal to generate a mixed frequency signal.

This embodiment may specifically include mixing the first frequency signal with the second frequency signal, and outputting the mixed frequency signal that contain the difference and the sum of the first frequency f1 and the second frequency f2.

This embodiment may further include modulating the amplitude of the mixed frequency signal to introduce amplitude modulation in a polar transmitter architecture.

Block 105: The carrier frequency signal selected from the mixed frequency signal is outputted.

This can be implemented by filtering or other appropriate means.

This embodiment may specifically include selecting the carrier frequency signal from the mixed frequency signal, wherein the carrier frequency is either the difference or the sum of the first frequency and the second frequency, and outputting the carrier frequency signal.

One of the difference or the sum of the first frequency f1 and the second frequency f2 may be chosen as the wanted carrier frequency fc and the other is removed by appropriate selection.

Using the difference frequency fc=f1−f2 allows the use of oscillator frequencies higher than the carrier frequency without using dividers. The benefit is that power consumption can be reduced since these dividers contribute significantly to the power consumption.

Block 106: The carrier frequency signal is fed back to the PLL feedback path.

Any perturbation or drift in fc, f2, and f1 will in this way be compensated by an equally large change in f1 originated from the PLL, as long as the range of f1 is adequate.

The method according to this embodiment may further include the following block.

Block 107: The first point modulation signal may be counter-modulated at a second point of the two-point modulation architecture.

The second point may be in the PLL. Because of the lower bandwidth of the PLL compared to the modulation bandwidth, the bandwidth of the counter-modulation may be reduced thereby simplifying its insertion.

The first point modulation is removed from the feedback signal by introducing the counter-modulation signal (CMS) so that the PLL does not see it. The feedback path is after the output and constitutes the second point in the two-point modulation architecture. Since the PLL does not see the modulation it will not be influenced by the limited bandwidth of the PLL. This allows wideband modulation of the carrier frequency despite low loop bandwidth.

In prior art the channel selection is realized by changing the division ratio N of the PLL. This change is attenuated by the loop transfer function of the PLL. In this embodiment, since the carrier frequency fc is decided by both f1 and f2, it is possible to select the channel by varying the second frequency f2. This change may be counter-inserted at the second point of the two-point modulation architecture. The PLL may be in a base station. The PLL should enable faster channel hopping than the solution in the prior art, an important feature when designing base station transceivers.

The PLL may be used in any transmitter where fast frequency change and/or wideband frequency modulation is needed.

According to the embodiment of the present invention we can see that because of the two-point modulation architecture the carrier frequency signal is modulated and the loop does not see the modulation, so the PLL can be modulated in a high modulation bandwidth despite low loop bandwidth. If the modulation signal is digital, it is possible to match the modulation signal and the counter modulation signal when using two-point modulation architecture. This increased matching compared to prior art increases modulation accuracy. Any perturbation or drift in fc, f2, and f1 will be compensated by an equally large change in f1. Using the difference frequency fc=f1−f2 enables the use of high oscillation frequencies while not having to use dividers, thus reducing power consumption. The pulling and injection locking can be reduced or avoided by controlling the first frequency f1 or the second frequency f2. The embodiment of the present invention can also enable a faster channel hopping via varying the second frequency f2. If the PLL is used in a base station, this can improve the performance of the base station.

Figure 2:
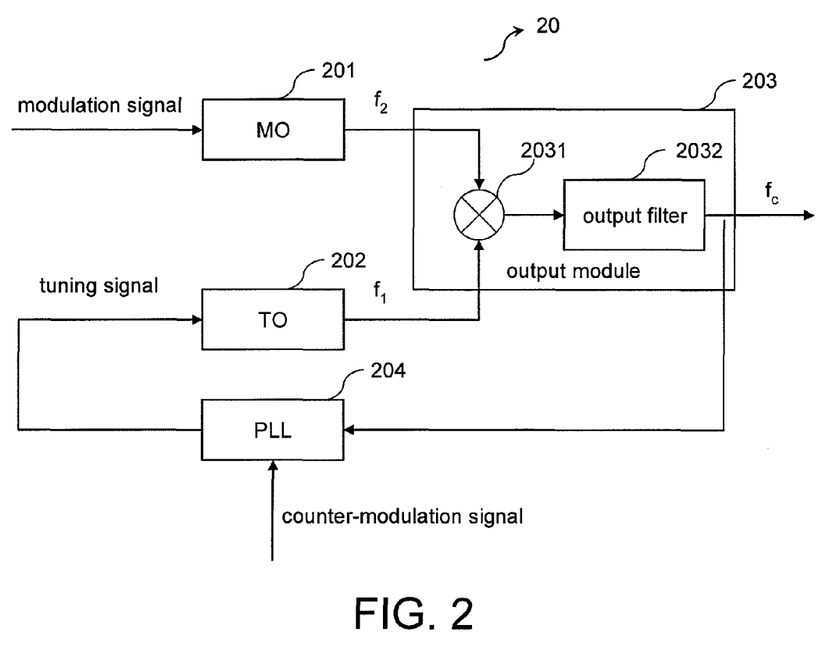
FIG. 2 is an architecture diagram of an apparatus according to one embodiment of the present invention.

One embodiment of the present invention will now be described with reference to FIG. 2 showing an apparatus 20 for generating a carrier frequency signal with a two-point modulation architecture. The apparatus 20 may be a frequency synthesizer. The apparatus 20 includes a modulation oscillator (MO) 201, a tuning oscillator (TO) 202 and an output module 203.

The TO 202 is configured to generate a first frequency signal with a nominal output frequency of f1. The input signal of the TO 202 may be a tuning signal.

The MO 201 is configured to be injected a modulation signal at a first point of the two-point modulation architecture, and is configured to generate a second frequency signal from the modulation signal with a nominal output frequency of f2.

The output module 203 is configured to introduce the second frequency signal into the loop after the TO 202 by mixing the first frequency signal and the second frequency signal to generate a mixed frequency signal, output the carrier frequency signal selected from the mixed frequency signal, and feed back the carrier frequency signal to a feedback path.

The apparatus 20 may further include a PLL 204 which is configured to counter modulate the first point modulation signal at a second point of the two-point modulation architecture.

Specifically, the PLL 204 removes the first point modulation of the carrier frequency by means of the counter-modulate signal (CMS). This constitutes the second point of the two-point modulation architecture. The counter modulation signal may be applied to the PLL 204 input. The PLL 204 divides the carrier frequency by a division ratio N and compares it to a reference frequency. It uses the error signal thereby produced to regulate the TO 202. The PLL 204 may be implemented as either an analogue PLL (APLL) or a digital PLL (DPLL). The CMS may be applied in the feedback path of the PLL 204. The CMS may be inserted as an offset to the division ratio N. Because of the lower bandwidth of the PLL 204 compared to the modulation bandwidth, the bandwidth of the counter modulation may be reduced thereby simplifying its insertion.

The MO 201 may be a first digitally controlled oscillator (DCO) or a first voltage controlled oscillator (VCO) or a hybrid of a first DCO and a first VCO. If the MO 201 is the first DCO, its input signal may be a digital modulation word (DMW). If the MO 201 is the first VCO, its input signal may be a modulation voltage (MV). If the MO is a hybrid oscillator, its input signal is both a DMW and a MV. The MO input signal may be denoted the modulation signal.

One problem with the two-point modulation architecture is matching the modulation and counter modulation, since the counter modulation signal is often digital in nature whereas the other is analogue. If the MO 201 is the first DCO with a digital input, since both the modulation signal and counter-modulation signal are essentially digital the matching between modulation and counter-modulation can be greatly increased and process and temperature invariant because of its digital nature and well controlled gain. This increased matching compared to prior art increases modulation accuracy. A hybrid oscillator may partially give the same benefit depending on the ratio of analogue to digital control range. The use of a hybrid oscillator may increase the resolution and flexibility of the system.

The TO 202 may be a second DCO or a second VCO. If the TO 202 is the second DCO, its input signal may be a digital tuning word (DTW). If the TO 202 is the second VCO, its input signal may be a tuning voltage (TV). If the TO 202 is the second DCO it is controlled by a DPLL. If the TO 202 is the second VCO it is controlled by an APLL. A VCO may also have a digital control input, but this input may be used for course control and is not considered a tuning input.

During inactive periods of the apparatus 20 the MO 201 and TO 202 are aligned using appropriate measures so that both oscillators operate under optimal working conditions.

The DCO (the first DCO or the second DCO) output frequency is determined by the value of its digitally controlled LC-tank which is not illustrated in the FIG. 2. This tank will consist of one variable part and one fixed part. The ratio of the variable to fixed part will determine the gain of the DCO. This ratio can be controlled through matching or compensated through measurement. The resolution of the variable part can be made sufficiently high.

The output module 203 may further include a mixer 2031 and an output filter 2032.

The mixer 2031 is configured to mix the first frequency signal with the second frequency signal, and output the mixed frequency signal that contain both the difference and the sum of the first frequency f1 and the second frequency f2.

The output filter 2032 is configured to select the carrier frequency signal from the mixed frequency signal, wherein the carrier frequency fc is either the difference or the sum of the first frequency f1 and the second frequency f2, output the carrier frequency signal, and feed back the carrier frequency signal to a feedback path.

Either the difference or the sum of the first frequency f1 and the second frequency f2 may be chosen as the wanted carrier frequency fc and the other is removed by appropriate selection of the output filter 2032. The carrier frequency signal is fed back to the PLL 204. Any perturbation or drift in fc, f1 and f2 will in this way be compensated by an equally large change in f1 originated from the feedback signal, as long as the range of f1 is adequate.

Using the difference frequency fc=f1−f2 enables the use of high oscillation frequencies while not having to use dividers, thus reducing current consumption. If the difference between fc and the sum frequency f1+f2 is large, a relatively simple RC-filter may be used for the output filter 2032. Using an LC-mixer the LC-tank constitutes one pole of this filter.

The output module 203 may be further configured to modulate the amplitude of the mixed frequency signal. Depending on the application, the mixer 2031 may also be used to modulate the amplitude of the mixed frequency signal using the signal A(t). Careful consideration is needed to make sure that the PLL 204 can handle an amplitude modulated signal.

The apparatus 20 may be used in a transceiver. An additional problem encountered in the transceiver is the effect of pulling and injection locking of the MO 201 or the TO 202 which causes spurs at the transmitter output.

So the TO 202 may be further configured to generate the first frequency signal whose frequency is not the same as the carrier frequency fc and any harmonics of the carrier frequency fc. Since the first frequency is not the same as the carrier frequency fc or its harmonics, the problem with pulling and injection locking of the TO 202 is reduced or avoided.

The modulation CO 202 may be further configured to generate the second frequency signal whose frequency is not the same as the carrier frequency fc and any harmonics of the carrier frequency fc. Since the second frequency is not the same as the carrier frequency fc or its harmonics, the problem with pulling and injection locking of the MO 201 is reduced or avoided.

In the prior art the channel selection of the apparatus 20 is realize by changing the division ratio N of the PLL 204. This change is attenuated by the loop transfer function of the PLL 204. Since the carrier frequency fc is decided by both f1 and f2, the MO 201 may also be configured to perform channel selection by varying the second frequency f2. This change may be counter-inserted at the second point of the two-point modulation architecture. The apparatus 20 may be used in a base station and enable faster channel hopping than the prior art solutions, an important feature when designing base station transceivers.

The apparatus 20 may be used in any transmitter where fast frequency change and/or wideband frequency modulation is needed.

According to the embodiment of the present invention we can see that because of the two-point modulation architecture the output of the TO 202 is directly modulated and the loop does not see the modulation, so the PLL can be modulated in a high modulation bandwidth despite low loop bandwidth. If the input signal nature of the MO 201 is digital, it is possible to match the modulation signal and the counter modulation signal when using two-point modulation architecture. This increased matching compared to prior art increases modulation accuracy. Any perturbation or drift in fc, f2, and f1 will be compensated by an equally large change in f1. Using the difference frequency fc=f1−f2 enables the use of high oscillation frequencies while not having to use dividers, thus reducing power consumption. The pulling and injection locking can be reduced or avoided by controlling the output frequency of the MO 201 or the TO 202. The embodiment of the present invention can also enable a faster channel hopping via varying the second frequency f2. If the apparatus 20 is used in a base station, this can improve the performance of the base station.

Some detailed embodiments are given to make the present invention more clear.

Figure 3:
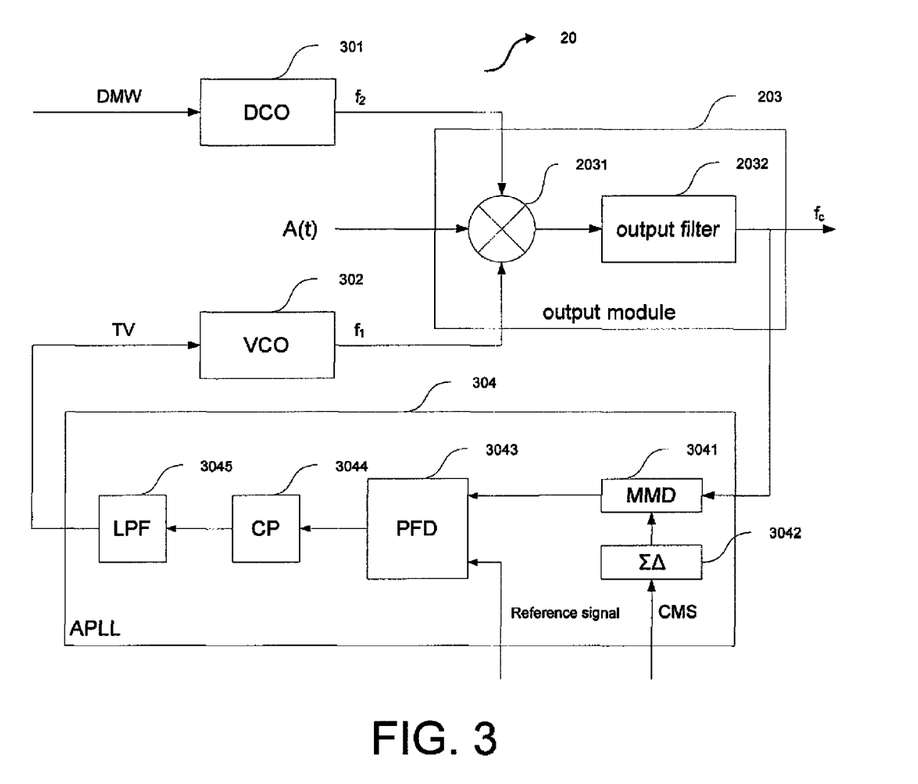
FIG. 3 is an architecture diagram of an apparatus according to one embodiment of the present invention.

One detailed embodiment of the present invention will now be described with reference to FIG. 3. It is assumed that the MO 201 is a DCO 301 and the TO 202 is a VCO 302. The input signal of the DCO 301 is a DMW. In other words, the modulation signal is the DMW. The input signal of the VCO is a TV. In other words the tuning signal TS is the TV. The PLL 204 is an analogue PLL (APLL) 304 which includes a Multi-Modulus Divider (MMD) 3041, a Sigma-Delta modulator (ΣΔ) 3042, a Phase-Frequency Detector (PFD) 3043, a Charge-Pump (CP) 3044 and a Low Pass Filter (LPF) 3045. As show in FIG. 4, the method for this detailed embodiment includes following blocks.

Figure 4:
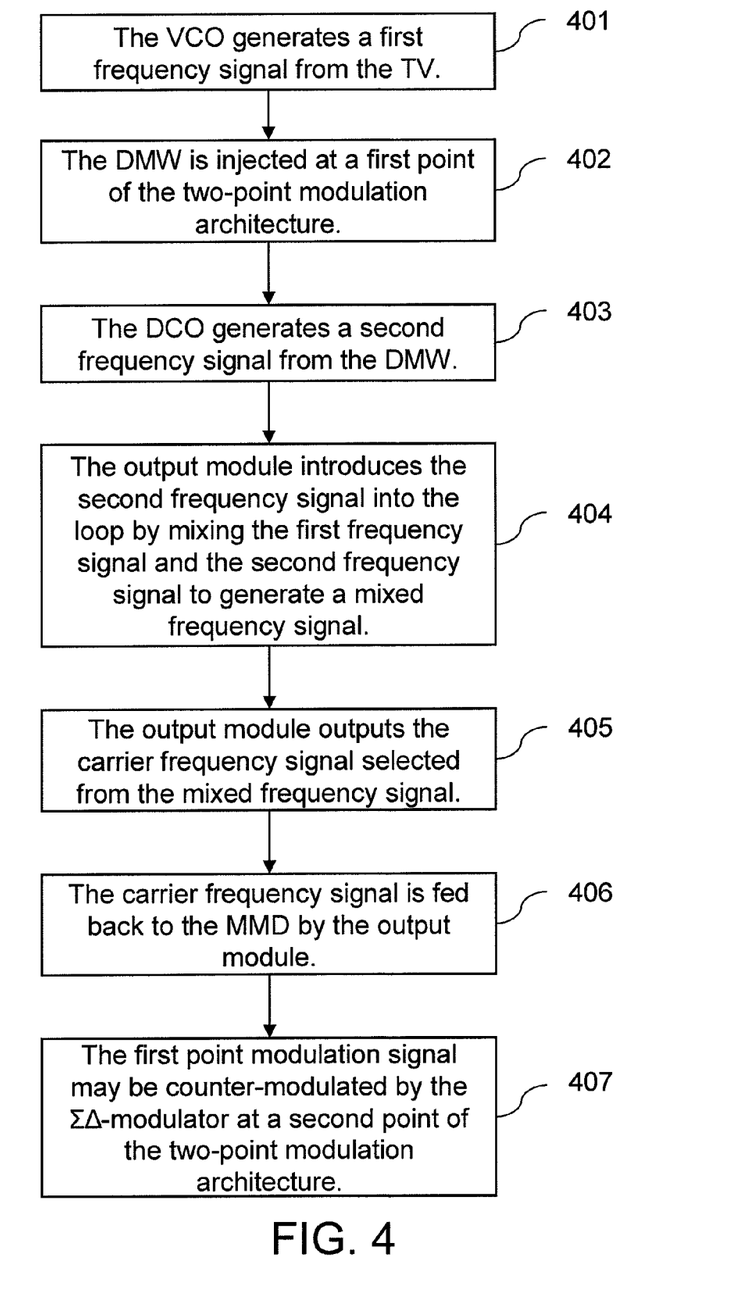
FIG. 4 is a block diagram of one embodiment of the present invention.

Block 401: The VCO 302 generates a first frequency signal from the TV.

This embodiment may specifically include the VCO 302 generates the first frequency signal whose frequency is not the same as the carrier frequency fc and any harmonics of the carrier frequency. Since f1 is not the same as fc or its harmonics the problem with pulling and injection locking of the VCO 302 is reduced or avoided.

Block 402: The DMW is injected at a first point of the two-point modulation architecture.

In other words, the DMW is injected into the DCO 301.

Block 403: The DCO 301 generates a second frequency signal from the DMW.

This embodiment may specifically include the DCO 301 generates the second frequency signal whose frequency is not the same as the carrier frequency fc and any harmonics of the carrier frequency from the DMW. Since f2 is not the same as fc or its harmonics the problem with pulling and injection locking of the DCO 301 is reduced or avoided.

Block 404: The output module 203 introduces the second frequency signal into the loop by mixing the first frequency signal and the second frequency signal to generate a mixed frequency signal.

This embodiment may specifically include the mixer 2031 mixes the first frequency signal with the second frequency signal, and outputs the mixed frequency signal that contain the difference and the sum of the first frequency f1 and the second frequency f2.

This embodiment may further include the output module 203 modulates the amplitude of the mixed frequency signal. Depending on the application, the mixer 2031 may also be used to modulate the amplitude of the output using the signal A(t). Careful consideration is needed to make sure the MMD 3041 can handle the now amplitude modulated signal.

Block 405: The output module 203 outputs the carrier frequency signal selected from the mixed frequency signal.

This embodiment may specifically include the output filter 2032 selects the carrier frequency signal from the mixed frequency signal, wherein the carrier frequency is the difference of the first frequency f1 and the second frequency f2, and output the carrier frequency signal.

The difference of the first frequency f1 and the second frequency f2 is chosen as the wanted carrier frequency fc and the sum frequency f1+f2 is removed by appropriate selection of the output filter 2032.

Using the difference frequency fc=f1−f2 enables the use of high oscillation frequencies while not having to use dividers, thus reducing current consumption.

Block 406: The carrier frequency signal is fed back to the MMD 3041 by the output module 203.

The MMD 3041 may divide the carrier frequency by an integer division ratio N. This embodiment includes the division ratio N being controlled by the ΣΔ-modulator 3042. Any perturbation or drift in fc, f2, and f1 which is not part of the modulation will in this way be compensated by an equally large change in f1 originated from the feedback signal, as long as the range of f1 is adequate.

Block 407: The first point modulation signal may be counter-modulated by the ΣΔ-modulator 3042 at a second point of the two-point modulation architecture.

The modulation in the carrier frequency signal is removed by modulating the input to the ΣΔ-modulator 3042. This counter-modulation constitutes the second point in the two-point modulation architecture. The input signal to the ΣΔ-modulator 3042 is digital, and the gain of the counter-modulation is precise. The DMW introducing the modulation to the DCO 301 is also digital, and the gain of the DCO 301 can be well controlled. This greatly reduces the problem of mismatch between modulation and counter-modulation found in prior art.

Because of the lower bandwidth of the APLL 304 compared to the modulation bandwidth, the bandwidth of the counter-modulation of the ΣΔ-modulator 3042 can be reduced thereby simplifying its insertion.

The method according to this embodiment may further include the MO 201 (DCO 301) selects the channel by varying the second frequency f2. This change may be counter-inserted at the second point of the two-point modulation architecture. The apparatus 20 may be in a base station and thereby enable faster channel hopping which is an important property in a base station transmitter.

The apparatus 20 may be used in any transmitter where fast frequency change and/or wideband frequency modulation is needed.

Figure 5:
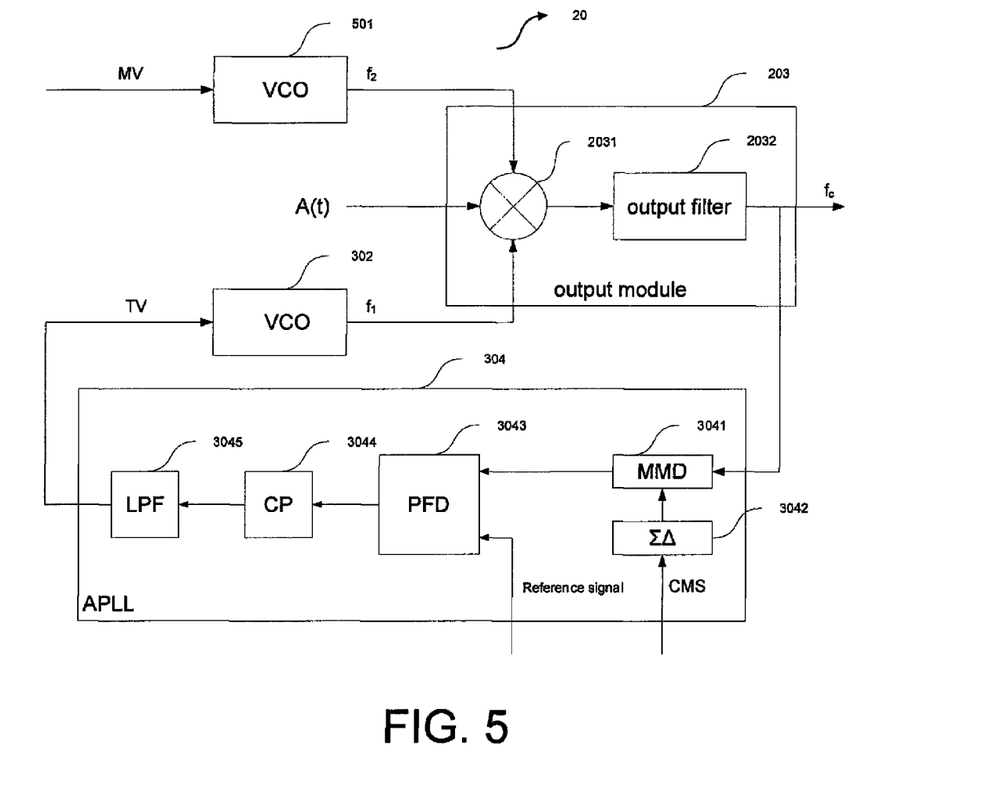
FIG. 5 is an architecture diagram of an apparatus according to one embodiment of the present invention.

One detailed embodiment of the present invention will now be described with reference to FIG. 5. The structure of the apparatus 20 in this detailed embodiment is similar to the FIG. 3 except that the MO 201 is assumed to be a first VCO 501. The tuning oscillator (TO) 202 is assumed to be the VCO 302. For clear, the VCO 302 is called the second VCO 302. The input signal of the first VCO 501 is a MV. In other words, the modulation signal is the MV. The input signal of the second VCO 302 is a TV. In other words, the tuning signal is the TV. As show in FIG. 6, the method for this detailed embodiment includes following blocks.

Figure 6:
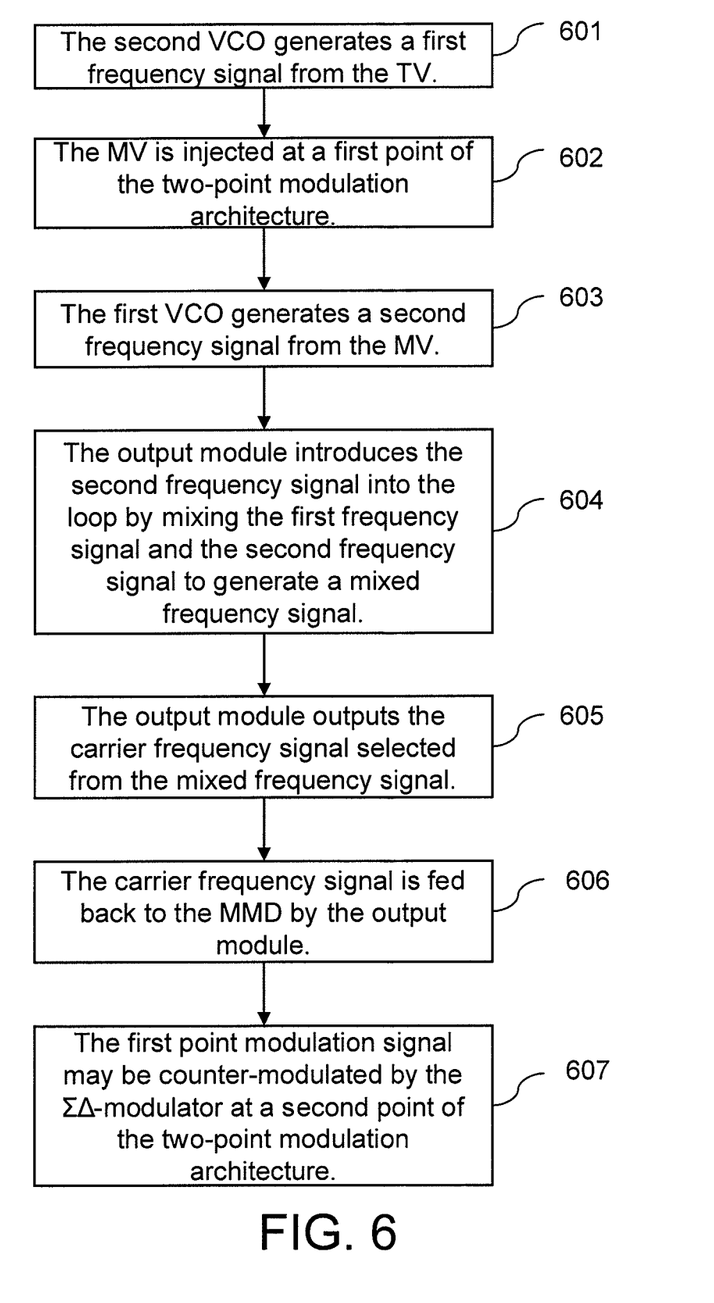
FIG. 6 is a block diagram of one embodiment of the present invention.

Block 601: The second VCO 302 generates a first frequency signal from the TV.

This embodiment may specifically include the second VCO 302 generates the first frequency signal whose frequency is not the same as the carrier frequency fc and any harmonics of the carrier frequency. Since f1 is not the same as fc or its harmonics the problem with pulling and injection locking of the VCO 302 is reduced or avoided.

Block 602: The MV is injected at a first point of the two-point modulation architecture.

In other words, the DMW is injected into the first DCO 301.

Block 603: The first VCO 501 generates a second frequency signal from the MV.

This embodiment may specifically include the first DCO 301 generates the second frequency signal whose frequency is not the same as the carrier frequency fc and any harmonics of the carrier frequency from the DMW. Since f2 is not the same as fc or its harmonics the problem with pulling and injection locking of the MO 201 is reduced or avoided.

Block 604: The output module 203 introduces the second frequency signal into the loop by mixing the first frequency signal and the second frequency signal to generate a mixed frequency signal.

This embodiment may specifically include the mixer 2031 mixes the first frequency signal with the second frequency signal, and output the mixed frequency signal that contain the difference and the sum of the first frequency f1 and the second frequency f2.

This embodiment further include the output module 203 modulates the amplitude of the mixed frequency signal. Depending on the application, the mixer 2031 may also be used to modulate the amplitude of the output using the signal A(t). Careful consideration is needed to make sure the MMD 3041 can handle the now amplitude modulated input signal.

Block 605: The output module 203 outputs the carrier frequency signal selected from the mixed frequency signal.

This embodiment may specifically include the output filter 2032 selects the carrier frequency signal from the mixed frequency signal, wherein the carrier frequency is the difference of the first frequency f1 and the second frequency f2, and output the carrier frequency signal.

The difference of the first frequency f1 and the second frequency f2 is chosen as the wanted carrier frequency fc and the sum frequency f1+f2 is removed by appropriate selection of the output filter 2032.

Using the difference frequency fc=f1−f2 enables the use of high oscillation frequencies while not having to use dividers, thus reducing current consumption.

Block 606: The carrier frequency signal is fed back to the MMD 3041 by the output module 203.

The MMD 3041 may divide the carrier frequency by an integer division ratio N. This embodiment includes the division ratio N being controlled by the ΣΔ-modulator 3042. Any perturbation or drift in fc, f2, and f1 which is not part of the modulation will in this way be compensated by an equally large change in f1 originated from the feedback signal, as long as the range of f1 is adequate.

Block 607: The first point modulation signal may be counter-modulated by the ΣΔ-modulator 3042 at a second point of the two-point modulation architecture.

The modulation in the carrier frequency signal is removed by modulating the input to the ΣΔ-modulator 3042. This counter-modulation constitutes the second point in the two-point modulation architecture.

If the bandwidth of the APLL 304 is lower compared to the modulation bandwidth the bandwidth of the counter-modulation of the ΣΔ-modulator 3042 can be reduced thereby simplifying its insertion.

The method according to this embodiment may further include the MO 201 (the first VCO 501) selects the channel for a base station by varying the second frequency f2. This change may be counter-inserted at the second point of the two-point modulation architecture. The apparatus 20 may be in a base station and thereby enable faster channel hopping which is an important property in a base station transmitter.

The apparatus 20 may be used in any transmitter where fast frequency change and/or wideband frequency modulation is needed or where good immunity to pulling and injection locking is important.

Figure 7:
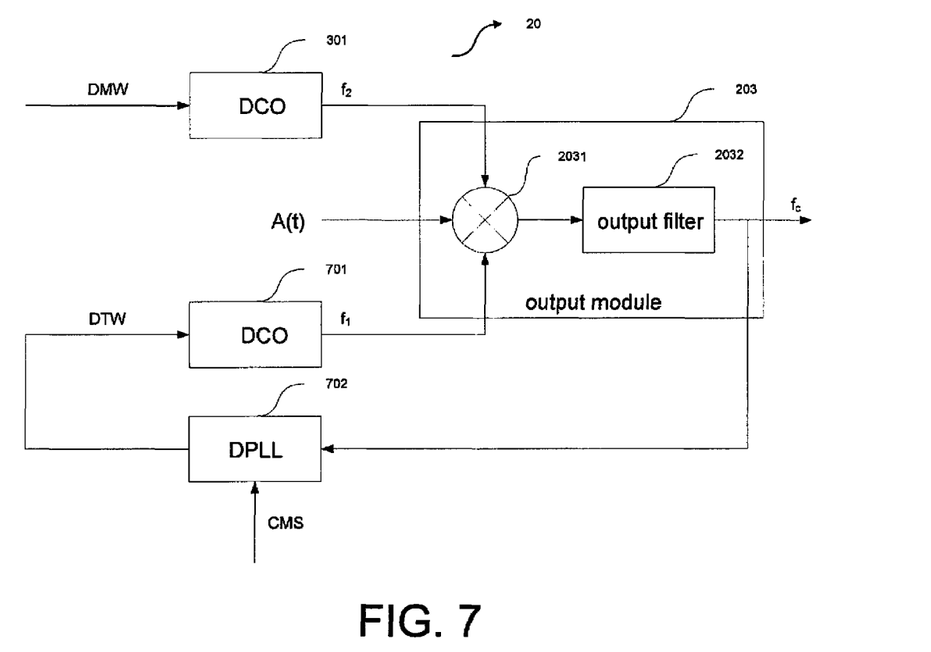
FIG. 7 is an architecture diagram of an apparatus according to one embodiment of the present invention.

One detailed embodiment of the present invention will now be described with reference to FIG. 7. The structure of the apparatus 20 in this detailed embodiment is similar to the embodiment in FIG. 3 except that the TO 202 is assumed to be a second DCO 701 and the PLL 204 is assumed to be a DPLL 702. For clear, the DCO 301 is called the first DCO 301. The input signal of the first DCO 301 is a DMW. In other words, the modulation signal is the DMW. The input signal of the second DCO 701 is a DTW. In other words, the tuning signal is the DTW. As show in FIG. 8, the method for this detailed embodiment includes following blocks.

Figure 8:
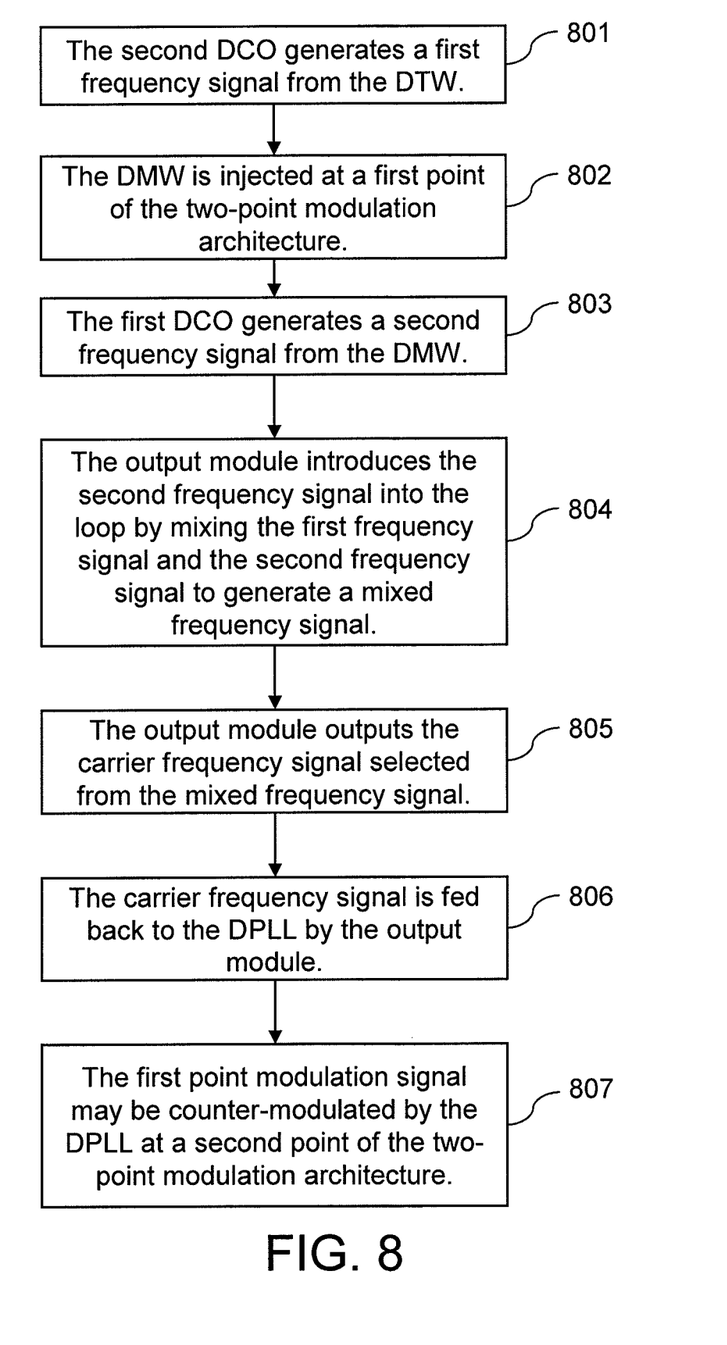
FIG. 8 is a block diagram of one embodiment of the present invention.

Block 801: The second DCO 701 generates a first frequency signal from the DTW.

This embodiment may specifically include the second DCO 701 generates the first frequency signal whose frequency is not the same as the carrier frequency fc and any harmonics of the carrier frequency. Since f1 is not the same as fc or its harmonics the problem with pulling and injection locking of the TO 202 is reduced or avoided.

Block 802: The DMW is injected at a first point of the two-point modulation architecture.

In other words, the MV is injected into the first DCO 301.

Block 803: The first DCO 301 generates a second frequency signal from the DMW.

This embodiment may specifically include the first DCO 301 generates the second frequency signal whose frequency is not the same as the carrier frequency fc and any harmonics of the carrier frequency from the DMW. Since f2 is not the same as fc or its harmonics the problem with pulling and injection locking of the MO 201 is reduced or avoided.

Block 804: The output module 203 introduces the second frequency signal into the loop by mixing the first frequency signal and the second frequency signal to generate a mixed frequency signal.

This embodiment may specifically include the mixer 2031 mixes the first frequency signal with the second frequency signal, and output the mixed frequency signal that contain the difference and the sum of the first frequency f1 and the second frequency f2.

This embodiment may further include the output module 203 modulates the amplitude of the mixed frequency signal. Depending on the application, the mixer 2031 may also be used to modulate the amplitude of the output using the signal A(t). Careful consideration is needed to make sure the feedback path in the digital PLL (DPLL) 702 can handle the now amplitude modulated input signal.

Block 805: The output module 203 outputs the carrier frequency signal selected from the mixed frequency signal.

This embodiment may specifically include the output filter 2032 selects the carrier frequency signal from the mixed frequency signal, wherein the carrier frequency is the difference of the first frequency f1 and the second frequency f2, and output the carrier frequency signal.

The difference of the first frequency f1 and the second frequency f2 is chosen as the wanted carrier frequency fc and the difference frequency f1+f2 is removed by appropriate selection of the output filter 2032.

Using the difference frequency fc=f1−f2 enables the use of high oscillation frequencies while not having to use dividers, thus reducing current consumption.

Block 806: The carrier frequency signal is fed back to the DPLL 702 by the output module 203.

The DPLL 702 regulates the DTW signal to obtain a certain ratio R between the carrier frequency fc and a reference frequency. The specific implementation of the DPLL 704 is not shown in FIG. 7. Any perturbation or drift in fc, f2, and f1 which is not part of the modulation will in this way be compensated by an equally large change in f1 because of the feedback of the DPLL 704 constitutes, as long as the range of f1 is adequate.

Block 807: The first point modulation signal may be counter-modulated by the DPLL 702 at a second point of the two-point modulation architecture.

The modulation in the carrier frequency signal is removed by modulating ratio R of the DPLL 704. This counter-modulation constitutes the second point in the two-point modulation architecture. The nature of the DPLL 704 is digital, and the ratio R is precise. The DMW introducing the modulation to the first DCO 301 is also digital, and the gain of the first DCO 301 can be well controlled. This greatly reduces the problem of mismatch between modulation and counter-modulation found in prior art.

Because of the lower bandwidth of the DPLL 704 compared to the modulation bandwidth the bandwidth of the counter-modulation of the DPLL 704 can be reduced thereby simplifying its insertion.

The method according to this embodiment may further include the MO 201 (the first DCO 301) (modulation CO 202) selects the channel by varying the second frequency f2. This change may be counter-inserted at the second point of the two-point modulation architecture. The apparatus 20 may be in a base station and thereby enable faster channel hopping which is an important property in a base station transmitter.

The apparatus 20 may be used in any transmitter where fast frequency change and/or wideband frequency modulation is needed.

The embodiments as well as the features of such embodiments described above can be combined if they do not exclude each other.

It will be understood that the invention is not restricted to the afore-described and illustrated exemplifying embodiments thereof and that modifications can be made within the scope of the inventive concept as illustrated in the accompanying Claims.

The invention claimed is:

1. A method for generating a carrier frequency signal in a two-point modulation architecture, comprising:
   generating, by a tuning oscillator (TO), a first frequency signal;
   injecting, by a modulation oscillator (MO), a modulation signal at a first point of the two-point modulation architecture;
   generating, by the MO, a second frequency signal from the modulation signal;
   mixing, by an output module, the first frequency signal and the second frequency signal to generate a mixed frequency signal;
   outputting, by the output module, the carrier frequency signal selected from the mixed frequency signal; and
   feeding back, by the output module, the carrier frequency signal to a feedback path;
   wherein outputting, by the output module, the carrier frequency signal selected from the mixed frequency signal comprises:
   selecting, by an output filter, the carrier frequency signal from the mixed frequency signal, wherein the carrier frequency is one of a difference and a sum of the first frequency and the second frequency, and output the carrier frequency signal.

2. The method according to claim 1, wherein the method further comprises:
   counter-modulating, by a PLL (Phase Locked Loop), the first point modulation signal at a second point of the two-point modulation architecture.

3. The method according to claim 1, wherein the modulation signal is one of a Digital Modulation Word (DMW) and a modulation voltage (MV).

4. The method according to claim 1, wherein generating, by the TO, a first frequency signal comprises generating, by the TO, the first frequency signal from one of a digital tuning word (DTW) and a tuning voltage (TV).

5. The method according to claim 1, wherein mixing, by the output module, the first frequency signal and the second frequency signal to generate a mixed frequency signal comprises:
   mixing, by a mixer, the first frequency signal with the second frequency signal to generate the mixed frequency signal that contains the difference and the sum of the first frequency and the second frequency.

6. The method according to claim 1, wherein mixing, by the output module, the first frequency signal and the second frequency signal to generate a mixed frequency signal further comprises modulating, by the output module, the amplitude of the mixed frequency signal.

7. The method according to claim 1, wherein generating, by the TO, a first frequency signal comprises generating, by the TO, the first frequency signal whose frequency is not the same as the carrier frequency and any harmonics of the carrier frequency.

8. The method according to claim 1, wherein generating, by the MO, a second frequency signal from the modulation signal comprises generating, by the MO, the second frequency signal whose frequency is not the same as the carrier frequency and any harmonics of the carrier frequency from the modulation signal.

9. The method according to claim 1, wherein the method further comprises selecting, by the MO, the channel by varying the second frequency.

10. A apparatus for generating a carrier frequency signal with a two-point modulation architecture, comprising:
    a tuning oscillator (TO), configured to generate a first frequency signal;
    a modulation oscillator (MO), to which is injected a modulation signal (MS) at a first point of the two-point modulation architecture, and which is configured to generate a second frequency signal from the modulation signal; and
    an output module, configured to introduce the second frequency signal into the loop after the TO by mixing the first frequency signal and the second frequency signal to generate a mixed frequency signal and outputting the carrier frequency signal selected from the mixed frequency signal, and feed back the carrier frequency signal to a feedback path;
    wherein outputting, by the output module, the carrier frequency signal selected from the mixed frequency signal comprises:
    selecting, by an output filter, the carrier frequency signal from the mixed frequency signal, wherein the carrier frequency is one of a difference and a sum of the first frequency and the second frequency, and output the carrier frequency signal.

11. The apparatus according to the claim 10, wherein the apparatus further comprises:
    a PLL, configured to counter-modulate the first point modulation signal at a second point in the two-point modulation architecture.

12. The apparatus according to claim 10, wherein the MO is a first digitally controlled oscillator (DCO) and the input signal of the first DCO is a digital modulation word (DMW).

13. The apparatus according to the claim 10, wherein the MO is a first voltage controlled oscillator (VCO) and the input signal of the first VCO is a modulation voltage (MV).

14. The apparatus according to the claim 10, wherein the MO is a hybrid oscillator and the input signal of the hybrid oscillator is both a MV and a DMW.

15. The apparatus according to claim 10, wherein the TO is a second DCO and the input signal of the second DCO is a digital tuning word (DTW).

16. The apparatus according to claim 10, wherein the TO is a second VCO and the input signal of the second VCO is a tuning voltage (TV).

17. The apparatus according to claim 10, wherein the output module comprises:
    a mixer, configured to mix the first frequency signal with the second frequency signal, and output the mixed frequency signal that contain the difference and the sum of the first frequency and the second frequency; and
    an output filter, configured to select the carrier frequency signal from the mixed frequency signal, wherein the carrier frequency is either the difference or the sum of the first frequency and the second frequency, output the carrier frequency signal, and feed back the carrier frequency signal to a feedback path.

18. The apparatus according to claim 10, wherein the output module is further configured to modulate the amplitude of the mixed frequency signal.

19. The apparatus according to claim 10, wherein the TO is further configured to generate the first frequency signal whose frequency is not the same as the carrier frequency and any harmonics of the carrier frequency and wherein the MO is further configured to generate the second frequency signal whose frequency is not the same as the carrier frequency and any harmonics of the carrier frequency.

20. The apparatus according to claim 10, wherein the MO is further configured to perform channel selection by varying the second frequency.

* * * * *